Figure 1A:
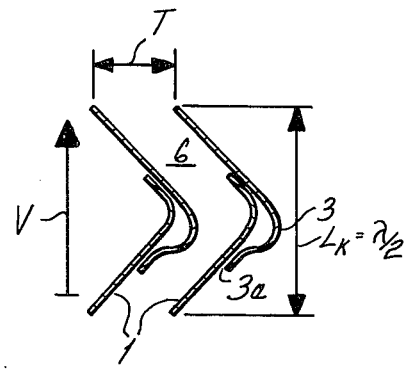
Figure 3:
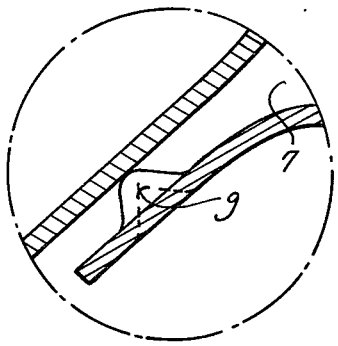

United States Patent [19]

Regehr

[11] 4,141,706
[45] Feb. 27, 1979

[54] DROPLET SEPARATOR

[76] Inventor: Ulrich Regehr, Susterfeldstr. 65, Aachen, Fed. Rep. of Germany, 5100

[21] Appl. No.: 792,998

[22] Filed: May 2, 1977

[30] Foreign Application Priority Data

May 4, 1976 [DE] Fed. Rep. of Germany ....... 2619688

[51] Int. Cl.² ............................................ B01D 45/16
[52] U.S. Cl. ...................................... 55/437; 55/440; 55/443
[58] Field of Search .......... 55/440, 442, 443, 257 PV, 55/257 QV, 437, 467

[56] References Cited

U.S. PATENT DOCUMENTS

| 3,338,035 | 8/1967 | Dinkelacker | 55/440 |
| 3,405,511 | 10/1968 | Halter et al. | 55/440 |
| 3,899,427 | 8/1975 | Connelly et al. | 55/440 X |
| 3,950,156 | 4/1976 | Kall | 55/440 |
| 3,953,183 | 4/1976 | Regehr | 55/440 |
| 3,977,977 | 8/1976 | Kall | 55/440 X |

Primary Examiner—Frank W. Lutter
Assistant Examiner—Kathleen J. Prunner
Attorney, Agent, or Firm—Karl F. Ross

[57] ABSTRACT

A droplet separator for removing liquid droplets from a gas stream entraining same, comprises a stack of corrugated plates having a given crest-to-crest spacing which can be represented as a wavelength λ and collecting pockets at each crest having inlet slots opening into the oncoming gas stream. Each plate consists of a plurality of plate members whose length, measured parallel to the wavelength measurement, is greater by the distance of the overlap of these plate members at each crest than n λ/2 where n is ½ or 1.

5 Claims, 8 Drawing Figures dimension U at a respective pocket.

DROPLET SEPARATOR

CROSS REFERENCE TO RELATED APPLICATION

The present application is related to my application (disclosing an earlier version of the present device) Ser. No. 665,869 filed Mar. 11, 1976, now abandoned, which, in turn, refers to U.S. Pat. No. 3,849,095.

FIELD OF THE INVENTION

The present invention relates to a device for the removal of liquid droplets from a gas stream entraining same and, more particularly, to a liquid droplet separator of the type which induces change in direction of a gas stream through flow passages defined between corrugated plates provided with liquid-collecting pockets at the crests of these plates.

BACKGROUND OF THE INVENTION

In the aforementioned copending application and in my earlier work as described above and including German Auslegeschrift DT-AS 22 51 173 (U.S. Pat. No. 3,977,977), there have been described droplets separators of the aforedescribed type operating on the principle that repeated direction change of a gas stream subdivided into individual streamlets between plates of a stack will cause the release of the droplets by inertia. In other words, the momentum or inertia of the liquid droplets causes them to be carried against the walls of the plates and into the liquid-collecting pockets at the crests of the corrugated plates, these pockets forming vertically extending ducts by which the liquid is discharged. The gas traversing the stack of plates is thus substantially free from droplets above a given particle size.

Notwithstanding the aforementioned teachings, and previous work in this field, the relationships between the plate characteristics, the flow-passage length and the interplate spacing have not been fully understood vis-a-vis an optimum removal of liquid droplets from a gas stream. Considerable effort has, therefore, been expanded in perfecting such particle droplet separators.

OBJECTS OF THE INVENTION

It is an object of the invention to improve the particle droplet separator described in the prior application and in the publications mentioned therein and hereinabove so as to obtain optimum liquid-droplet removal from a gas stream.

A corollary to this object is the object of eliminating certain disadvantages of the earlier system, whether these disadvantages derive from designed considerations, are problems of low efficiency, or are difficulties encountered with removing droplets up to a limiting minimum particle size.

SUMMARY OF THE INVENTION

These objects and others which will become apparent hereinafter are attained, in accordance with the present invention, in a droplet separator for removing liquid droplets above a minimum limiting droplet diameter d from a gas stream entraining the droplets with a defined droplet-size spectrum at an inlet velocity v. The droplet separator comprises a stack of vertically extending corrugated separator plates having an interplate spacing T, a crest-to-crest spacing along each plate of the value $\lambda$, and collecting pockets at each crest having inlet slots opening into the oncoming gas stream traversing respective flow passages between each pair of plates from an inlet side of the stack to an outlet side thereof. These passages have a length measured in a straight-line dimension between the inlet and the outlet sides of the value $L_K$.

Hereinafter, the aforementioned crest-to-crest spacing $\lambda$ is also referred to as the "wavelength" by analogy to sinusoidal waves. In fact, the corrugated plates are preferably sinusoidally corrugated.

According to the invention, each of the plates is formed by a plurality of plate members of a length $L_T$ measured along the aforementioned straight-line dimension, the successive plate members of each plate overlapping over a distance U along the straight-line dimension at a respective pocket.

It is also essential to the present invention that the length $L_T$ is greater by the distance U than the value $n\lambda/2$ where n is ½ or 1.

According to another essential aspect of the invention, the passage length $L_K$ is substantially equal to $m\lambda/2$ where m is an integer.

Also essential to the invention is the fact that the product of the inlet velocity v and $\lambda$, i.e. $v\lambda$, corresponds to the product of the passage length $L_K$ and a characteristic velocity $v_c$ constituting the allowable inlet velocity of the droplet separator at which the spacing T defines the limiting droplet diameter.

To clarify the significance of the fact that the length $L_T$ is greater by the distance U than $n\lambda/2$ where n is ½ or 1, it can be observed that, where the overall length of the flow passage $L_K$ is equal to $\lambda/2$, i.e. m = 1, the partial plates or the plate members constituting each of the corrugated plates, will have a length measured parallel to the dimension $L_K$ which is equal to $\lambda/4$ + U. In this case, of course, n = ½. Normally, however, the passage length will be equal to $\lambda$ or more in which case n = 1.

The permissible inlet velocity of the droplet separator for a flow passage length $L_K = \lambda$ is defined as that inlet velocity at which a predetermined limiting droplet diameter d exists above which diameter, all droplets are removed.

It has been found, most surprisingly, that when the plate spacing corresponding to the dimension T has a given value T1 corresponding to a limiting droplet diameter $d_{T1}$ it is possible to determine the spacing T2 for any other limiting droplet diameter $d_{T2}$ from the relationship $(d_{T1}/d_{T2})^2 = T1/T2$. Obviously, this relationship also determines the ratio of the limiting droplet diameters which can be obtained for a given ratio of interplate spacings under the conditions set forth above.

I have found, according to another feature of the invention, that the spacing T should range from 15 to 30 mm practically in all cases in which industrial exhaust gases are to be stripped of liquid droplets. When this interplate spacing is used, the wavelength $\lambda$ should be between 2 and 7 times the interplate spacing T.

According to still another feature of the invention, the plate members (partial plates of each of the separator plates) abut one another at the edges of the slots of the respective pockets turned toward the oncoming gas stream, via gap-defining elements which may be deformed in the plate members or disposed between them as separate members.

According to still another feature of the invention, which has been found to increase still further the degree of separation in the fine droplet region of the droplet-particle spectrum, the discharge or outlet portion of the stack is formed with mutually parallel walls generally lying in the flow direction but formed with undulations, e.g. of sinusoidal configuration, whose wavelength (crest-to-crest spacing) is small in proportion to the wavelength λ of the corrugated plates forming the main portion of the stack.

The advantages attained with the present system include increased separating efficiency and the ability to establish without trial and error the parameters of a particle separator which will ensure removal of liquid droplets above limiting particle diameters which can vary from case to case and for different inlet flow velocities which may likewise vary from one application to another of the droplet separator.

The apparatus of the present invention can thus be used for different gases with different separating effects, as required, and the apparatus can be assembled from standarized units to provide flow passages of discrete lengths, i.e. λ/2, λ, 3λ/2, 2λ, 5λ/2 . . . , with optimization of the effect simply by choice of the desired flow passage length.

Furthermore, the present arrangement of plural plate members to constitute each of the plates permits the overlap of the plate members to be adjusted, the depth of the collecting pockets to be varied independently of the pocket overlap and the number of pockets to be established with relatively simple means, e.g. the insertion of spacers between the plate members, for optimization of the particular separation which is to be undertaken.

BRIEF DESCRIPTION OF THE DRAWING

The above and other objects, features and advantages of the present invention will become more readily apparent from the following description, reference being made to the accompanying drawing in which:

FIG. 1*a* is a horiztonal cross section through a portion of a plate stack of a droplet separator embodying the invention;

FIG. 1*b* is a similar view of another embodiment of the invention;

FIGS. 1*c* and 1*d* are further illustrations similar to FIGS. 1*a* and 1*b* of other embodiments of the invention, it being noted that the partial FIGS. 1*a* through 1*d* illustrate different arrangements of the plates of the stack corresponding to different inlet flow velocities for a given limiting droplet diameter d;

FIG. 2 is a view similar to that of FIGS. 1*a* through 1*d*, although greatly enlarged in scale, illustrating still another droplet separator and showing details of the construction thereof;

FIG. 3 is a section, further enlarged in scale through the particle separator of FIG. 2 in the region III thereof;

FIG. 4 is a view similar to FIG. 2 illustrating another embodiment; and

FIG. 5 is a detail view of the region V of FIG. 4.

SPECIFIC DESCRIPTION AND EXAMPLE

The device illustrated in the drawing is a droplet separator for the removal of liquid droplets from a flowing gas stream. The gas flow direction has been represented by the single headed arrow v in the drawing, the arrow v representing in each of the embodiments of FIGS. 1*a* through 1*d* a vector illustrating the inlet velocity and magnitude. The gas stream entrains droplets of a defined droplet size spectrum and the device is constructed to remove droplets of a diameter above the droplet limiting diameter d substantially completely, i.e. the gas stream emerging from the unit should be free from droplets of a diameter larger than d.

The apparatus comprises, in addition to the usual housing (not shown) and means for forcing the gas stream therethrough a stack of preferably sinusoidally corrugated plates 1 which are disposed vertically and have at their crests 2 collecting pockets 3 which open at slots 3*a* generally into the direction from which the stream arrives, i.e. into the oncoming gas stream. As has been illustrated in FIGS. 2 and 4, the stack may also comprise parallel-wall inlet sections 4 and parallel-wall outlet section 5.

As can be seen from the embodiments of FIGS. 1*a* through 1*d*, each pair of plates 1 defines between them a flow passage 6. It is customary to supply a multiplicity of such passages and in the embodiments of FIGS. 1*a* through 1*d*, 2 and 4, it will be understood that the single passage or two passages illustrated are only representative of a multiplicity of such passages and the corresponding number of parallel corrugated plates 1.

The corrugations of the plates 1 define a wavelength λ which can be considered as the intercrest or crest-to-crest spacing. The value λ has been shown in FIG. 1*b* by a corresponding double-headed arrow.

In each of the Figures, where convenient, a double-headed arrow $L_K$ represents the flow-passage length as measured parallel to the inlet velocity vector v.

The plates are generally so oriented that the collecting passage 7 formed by each pocket 3 lies substantially vertically, i.e. perpendicular to the plane of the paper in FIGS. 1 through 5.

As a comparison of the Figures will show, each of the corrugated plates 1 is composed of substantially Z-shaped or S-shaped plate members a and b which overlap at regions 8 defining the pockets 3. The overlap dimension has been shown by the double-headed arrow U in the drawing.

According to the invention, the partial-plate length $L_T$, i.e. the length parallel to the inlet vector v of one of the plate members a, b defining each plate 1 is greater by the pocket overlap dimensions U than the half wavelength λ/2. This corresponds to a value n (as defined previously) equals 1.

The plates 1 of each stack can be assembled from a succession of the plate members a and b as a comparison of FIGS. 1*a* through 1*d* will show so that the flow passage length $L_K$ corresponds to an integral number of half wavelengths λ/2, i.e. m = an integer. In addition, the product of the inlet velocity v and the wavelength λ is as close as possible to the product of the flow passage length $L_K$ and a characteristic velocity $v_c$.

This characteristic velocity of the gas is defined as the permissible or allowable inlet velocity of the device for the flow passage length $L_K = \lambda$ for an unchanging (constant) particle size distribution droplet spectrum and interplate spacing.

The interplate spacing T thus defines the limiting droplet diameter d.

At the left hand side of each FIGS. 1*a* through 1*d*, the velocity vector v has been shown while the flow passage length $L_K$ in terms of λ has been shown on the right hand side of each FIGURE. It is thus readily apparent that, for a given interplate spacing T and particle size distribution, the same limiting particle diameter d will pertain to increasing velocities v with corresponding increases in the flow passage lengths by units of λ/2.

If it is desired to change the limiting droplet diameter d, the interplate spacing T is varied. It has been found that once the spacing T1 is ascertained for a given droplet diameter $d_{T1}$, all other conditions being the same, the spacing T2 for any other particle size limiting diameter $d_{T2}$, is given by the relationship $(d_{T1}/d_{T2})^2 = T1/T2$.

It will be also apparent from this relationship and the drawing that, if the limiting particle size diameter d is to be greater by the factor 2, the spacing T must be increased by the factor 4. In industrial practice, the spacing T should range between 15 and 30 mm for the processing of industrial waste gases. The wavelength L, by way of specific example of the best mode or practicing the invention, should be between 2 times and 7 times the interplate spacing T.

Figure 2:
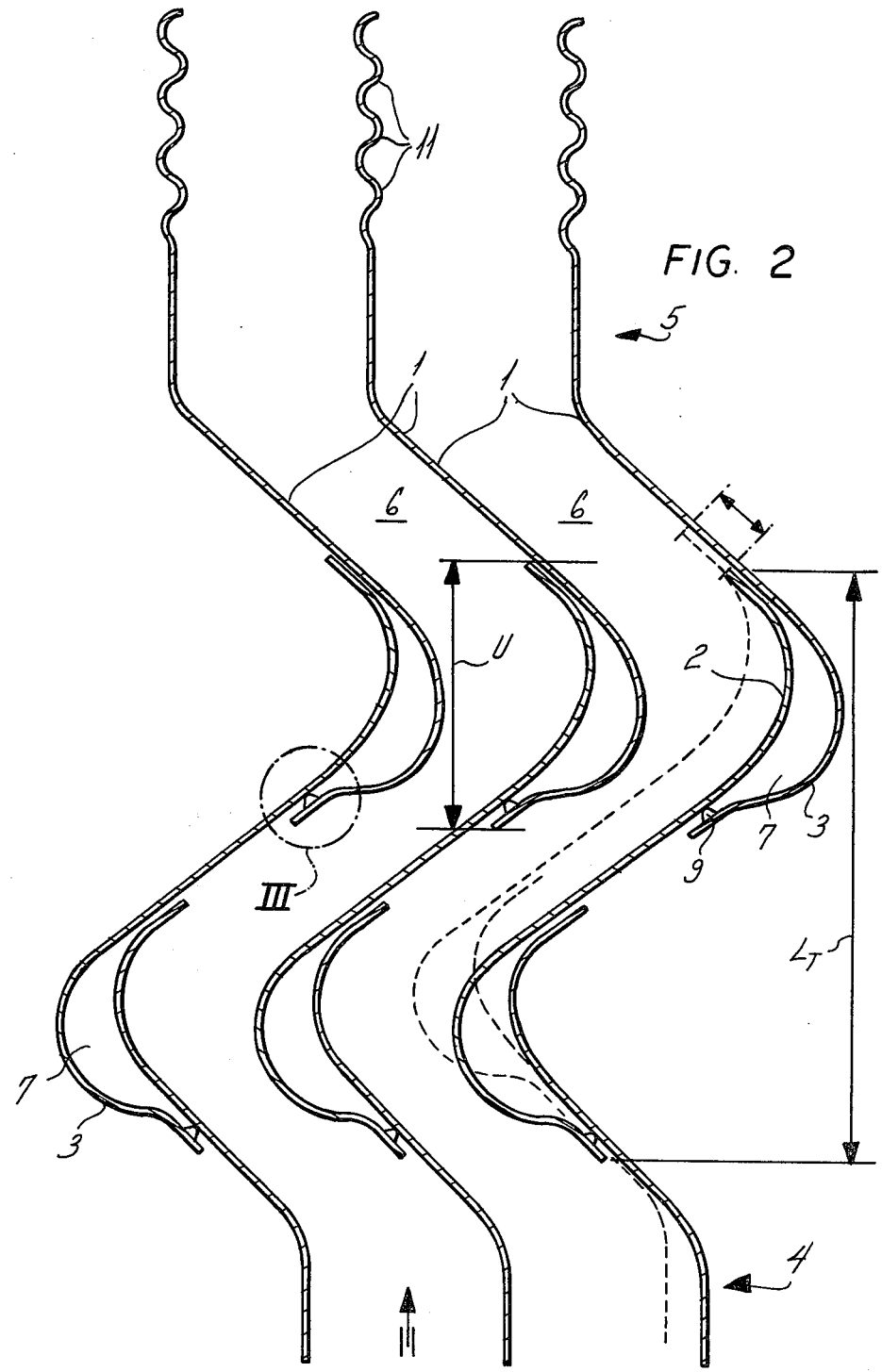

The embodiment of FIG. 2 shows that the pockets 3 may be provided with gap-defining elements 9 as constituted as formations deformed directly in the plate members. This can apply also for the plate members of FIGS. 1a through 1d.

Formations 9 are protuberances formed on one of the plate members and engaging the other plate member defining the respective pocket at the downstream side thereof.

Figure 5:
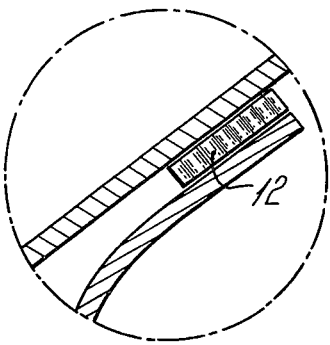
Figure 1D:
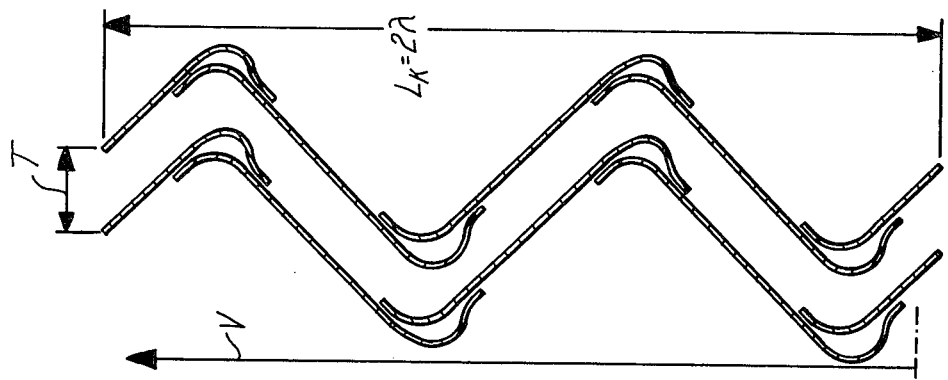
Figure 1C:
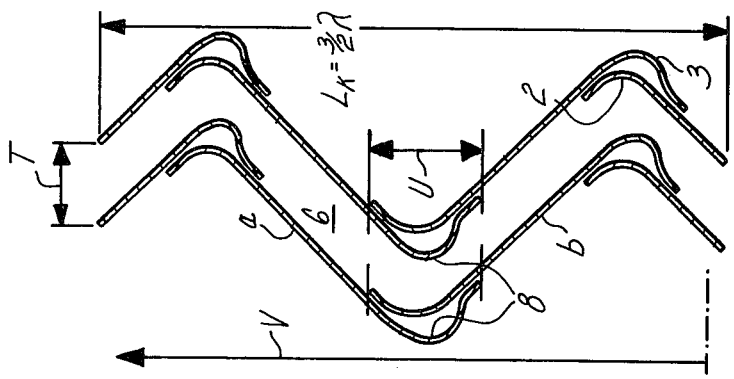
Figure 1B:
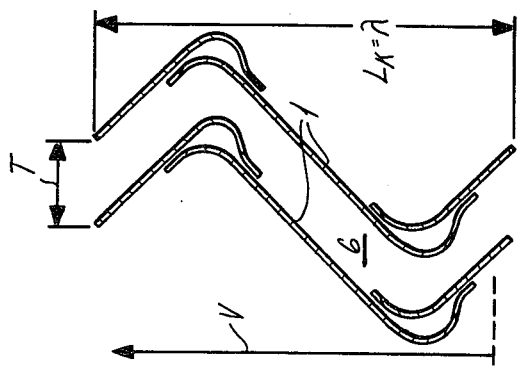
Figure 4:
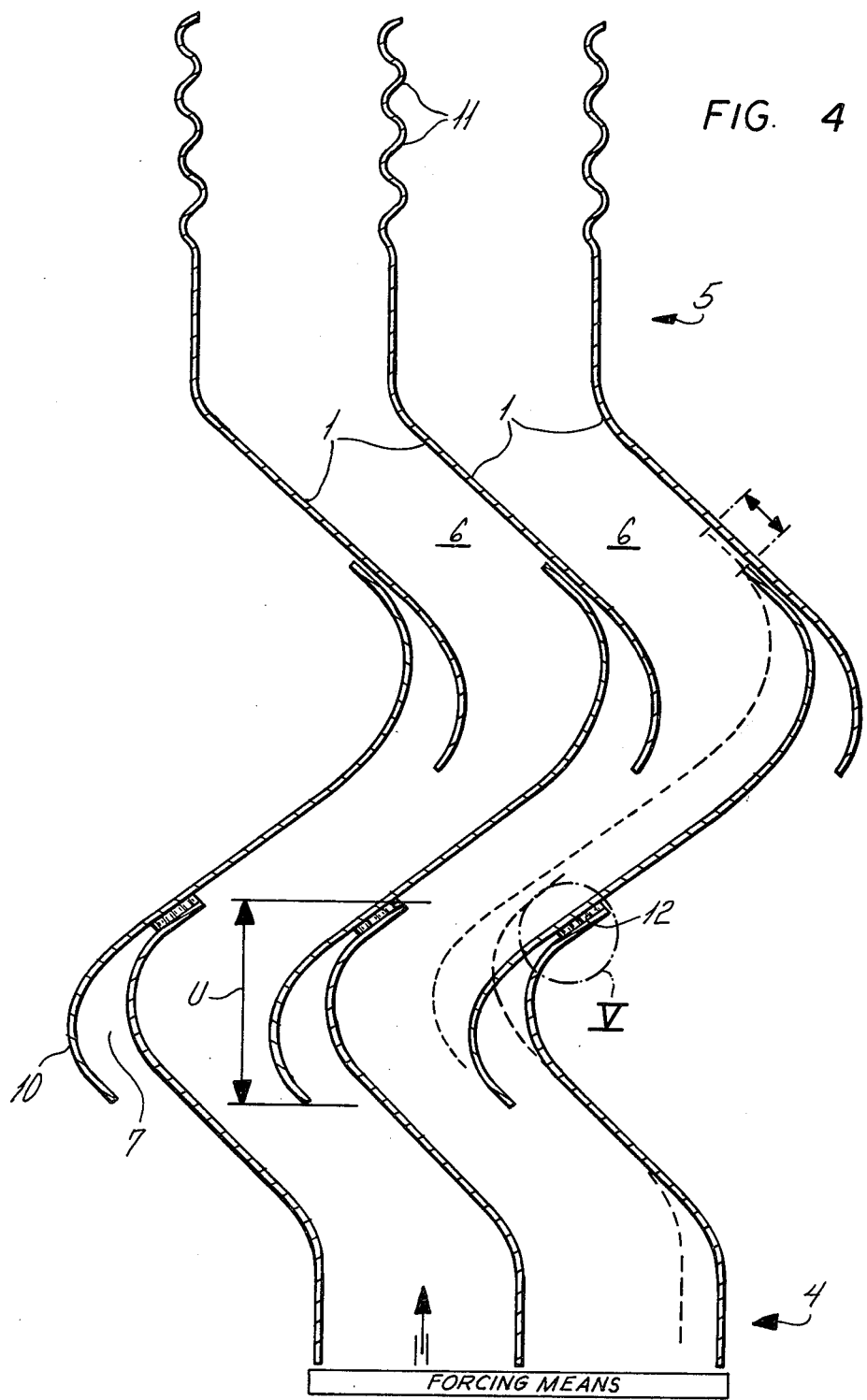

In FIG. 4, I have shown an arrangement whereby pocket-forming elements 10 are provided, these elements being integral with the plate members and bent from parts thereof or being constituted as separate pieces attached thereto. The outlet portion 5 of the stack has the parallel walls formed by the plates 1 provided with corrugations 11 whose wavelength is relatively small in comparison to the wavelength λ of the plates 1. The pockets of the embodiment of FIG. 4 can have a variable volume as a result of relative shifting of the plate members of each plate as illustrated in broken lines in FIGS. 2 and 4. In FIG. 5, the members forming each pocket are shown to have spacing elements 12 disposed therebetween to permit variation of the pocket volume. The spacer elements 12 can be welded in place and can be corrugated strips extending in spaced apart horizontal planes.

I claim:

1. In a droplet separator for removing all liquid droplets of a size above a minimum limiting droplet diameter d from a gas stream entraining said droplets with a defined droplet-size spectrum at an inlet velocity v and comprising a stack of vertically extending corrugated separator plates having an interplate spacing T, a crest-to-crest spacing λ on each plate and collecting pockets at each crest having inlet slots opening into the gas stream traversing respective flow passages between said plates between an inlet side of said stack and an outlet side thereof, said passages having a length $L_K$ measured in a straight-line dimension between said inlet and outlet sides, the improvement which comprises, in combination with means for supplying the gas stream to said inlet side of said stack at said velocity v:

(a) each of said plates is formed by a plurality of plate members of length $L_T$ measured in a straight-line dimension between the inlet and outlet sides of the stack, the successive plate members of each plate overlapping over a distance U measured in a straight-line dimension between the inlet and outlet sides of the stack at a respective pocket;

(b) the length $L_T$ being greater by the distance U than nλ/2 where n is the number selected from one half and one;

(c) said passage length $L_K$ is substantially equal to m λ/2 where m is an integer; and (d) the product of the inlet velocity v and λ corresponds to the product of the passage length $L_K$ and a characteristic velocity $v_c$ constituting the allowable inlet velocity of the separator at which the spacing T defines the limiting droplet diameter d, λ being between 2 and 7 times T.

2. The device defined in claim 1 wherein for a given interplate spacing T1 corresponding to a limiting droplet diameter $d_{T1}$, interplate spacing T2 is established to determine another limiting droplet diameter $d_{T2}$ in accordance with the relation $(d_{T1}/d_{T2})^2 = T1/T2$.

3. The separator defined in claim 1 wherein the interplate spacing T is 15 to 30 mm.

4. The separator defined in claim 1 wherein at least one of the plate members at each of said pockets is provided with spacing formations engaging the other plate member at the respective pocket at the inlet to each pocket.

5. The separator defined in claim 1 wherein said stack has an outlet region at which said gas stream emerges from said corrugations, the plates in said outlet region being formed with undulations having a crest-to-crest spacing which is smaller than λ.

* * * * *